(12) United States Patent
Hidaka et al.

(10) Patent No.: US 9,869,537 B2
(45) Date of Patent: Jan. 16, 2018

(54) CONTACT PROBE

(71) Applicant: MITUTOYO CORPORATION, Kanagawa (JP)

(72) Inventors: Kazuhiko Hidaka, Hino (JP); Takeshi Yamamoto, Zama (JP)

(73) Assignee: MITUTOYO CORPORATION, Kanagawa (JP)

( * ) Notice: Subject to any disclaimer, the term of this patent is extended or adjusted under 35 U.S.C. 154(b) by 132 days.

(21) Appl. No.: 15/059,528

(22) Filed: Mar. 3, 2016

(65) Prior Publication Data

US 2016/0258732 A1 Sep. 8, 2016

(30) Foreign Application Priority Data

Mar. 5, 2015 (JP) ................................ 2015-043126

(51) Int. Cl.
*G01B 5/012* (2006.01)
*G01B 3/00* (2006.01)

(52) U.S. Cl.
CPC ............ *G01B 3/002* (2013.01); *G01B 3/008* (2013.01); *G01B 5/012* (2013.01)

(58) Field of Classification Search
CPC ............................... G01B 3/002; G01B 5/008
USPC .............. 33/503, 559, 561, DIG. 1
See application file for complete search history.

(56) References Cited

U.S. PATENT DOCUMENTS

| | | | | |
|---|---|---|---|---|
| 4,738,033 A * | 4/1988 | Ferber | .................. | B23Q 1/0063 33/559 |
| 5,028,901 A * | 7/1991 | Enderle | .............. | B23Q 3/15526 33/561 |
| 5,041,806 A * | 8/1991 | Enderle | ................ | B23Q 3/1546 33/561 |
| 5,111,592 A * | 5/1992 | Aehnelt | ................. | G01B 3/008 33/504 |
| 5,345,690 A * | 9/1994 | McMurtry | ............. | G01B 5/012 33/558 |
| 5,756,886 A * | 5/1998 | Nishimura | ............. | G01B 5/016 33/558 |
| 6,182,370 B1 * | 2/2001 | Baur | .................... | G01D 5/2451 33/1 N |
| 7,055,258 B2 * | 6/2006 | Hajdukiewicz | ........ | G01B 5/012 33/559 |
| 2001/0054237 A1 * | 12/2001 | Hidaka | .................. | G01B 7/012 33/561 |
| 2002/0180470 A1 * | 12/2002 | Yoda | .................. | G01R 31/2808 324/756.05 |

(Continued)

FOREIGN PATENT DOCUMENTS

JP   11-141537       5/1999
JP   2010-286475   12/2010

*Primary Examiner* — G. Bradley Bennett
(74) *Attorney, Agent, or Firm* — Greenblum & Bernstein, P.L.C.

(57) ABSTRACT

A contact probe includes a stylus, a spring, a magnetic body, and a permanent magnet. The stylus is displaceable in an X direction and a tip of the stylus makes contact with a measured object. A first end of the spring is fixated and a second end provides spring force along the X direction. A position of the magnetic body is fixated with respect to the stylus. The permanent magnet is arranged separated from the magnetic body so as to generate a magnetic force along the X direction between the magnetic body and the permanent magnet.

11 Claims, 6 Drawing Sheets

(56) References Cited

U.S. PATENT DOCUMENTS

| | | | |
|---|---|---|---|
| 2006/0070253 A1* | 4/2006 | Ruijl | G01B 3/008 |
| | | | 33/559 |
| 2006/0123649 A1* | 6/2006 | Muller | G01B 7/012 |
| | | | 33/559 |
| 2016/0290797 A1* | 10/2016 | Bos | G01B 21/04 |
| 2017/0227345 A1* | 8/2017 | Sakai | G01B 5/016 |

* cited by examiner

CONTACT PROBE

CROSS-REFERENCE TO RELATED APPLICATIONS

The present application claims priority under 35 U.S.C. § 119 of Japanese Application No. 2015-043126, filed on Mar. 5, 2015, the disclosure of which is expressly incorporated by reference herein in its entirety.

BACKGROUND OF THE INVENTION

1. Field of the Invention

The present invention relates to a contact probe.

2. Description of Related Art

In a coordinate measuring machine, a scanning measurement is performed by bringing a scanning probe into contact with a surface of a measured object. When using an elastic hinge in a guide mechanism (in three axis directions of X, Y, Z) of the scanning probe, a measurement force of the probe is generated by a spring constant in a bending direction of the elastic hinge. The higher a rigidity of the guide mechanism is, the larger the spring constant becomes, and the larger the measurement force of the probe becomes. When the measurement force of the probe becomes large, certain influences are increased, such as an influence from a frictional force generated between a workpiece and a stylus during measurement and an influence from bending of the stylus mounted on the probe. As a result, highly accurate measurement becomes difficult.

By contrast, a technique of stabilizing the measurement force is known, in which fluctuation of the measurement force of a detector is inhibited by detecting and controlling the measurement force (Japanese Patent Laid-open Publication No. 2010-286475).

In addition, a technology is proposed for a measuring device using an elastic hinge mechanism in which a restoring characteristic of the elastic hinge is adjusted using magnets (Japanese Patent Laid-open Publication No. H11-141537).

However, inventors of the present invention have discovered an issue, as discussed below, with respect to the above-noted techniques. For example, in order to adjust the measurement force, the rigidity of the spring or the elastic hinge that provides the measurement force is lowered, and when the spring constant in the bending direction becomes small, the rigidity in another direction such as twisting or curving becomes lower as well. As a result, the influence of deformation other than in the bending direction due to the measurement force becomes greater and leads to deterioration in measurement accuracy. Accordingly, to achieve high accuracy for the scanning probe, a scanning probe with high rigidity and a small spring constant in the bending direction is required.

By contrast, in the technique disclosed in Japanese Patent Laid-open Publication No. 2010-286475, though the measurement force is adjustable, controlling the measurement force generates heat, which affects the form measuring machine in the form of thermal deformation and the like and leads to a decrease in measurement accuracy. In addition, electrical noise is generated by executing control of the measurement force, which leads to a further decrease in measurement accuracy. Furthermore, a need to mount a controller on the form measuring machine increases costs of the form measuring machine.

SUMMARY OF THE INVENTION

The present invention was conceived in light of the circumstances above, and the present invention adjusts a measurement force of a contact probe with a simple configuration.

One aspect of the present invention is a contact probe that includes a stylus displaceable in a first direction where a tip comes into contact with a measured object; an elastic member (also referred to as an elastomer) where a first end is fixated and a second end provides force to the stylus along the first direction; a first magnetic member (first magnet) where a position with respect to the stylus is fixated; and a second magnetic member (second magnet) arranged separate from the first magnetic member so as to generate a magnetic force along the first direction between the first magnetic member and the second magnetic member. Accordingly, the measurement force acting upon the stylus can be a resultant force of a spring force and a magnetic force. Thereby, changes in the spring force and the magnetic force in response to a displacement of the stylus can adjust the measurement force with a simple configuration.

Another aspect of the present invention is the contact probe described above, in which an attraction force generated by the magnetic force acts on an area between the first magnetic member and the second magnetic member. Accordingly, the magnetic force acts to cancel out the spring force. Therefore, it becomes possible to inhibit a magnitude of a force acting upon the stylus and to equalize the magnitude of the force. As a result, the measurement force acting upon the measured object can be inhibited and equalized.

Another aspect of the present invention is the contact probe described above, in which the magnitude of the resultant force of the force applied to the stylus by the elastic member and the attractive force is constant with respect to displacement of the stylus. Thereby, the measurement force of the stylus during measurement can be stabilized.

Another aspect of the present invention is the contact probe described above, in which a repulsive force generated by the magnetic force acts on the area between the first magnetic member and the second magnetic member. Accordingly, the magnetic force is generated in the same direction as the spring force. Thereby, the magnitude of the force acting upon the second magnetic member can be increased. As a result, the measurement force acting upon the measured object can be increased and responsiveness of the measurement can be changed.

Another aspect of the present invention is the contact probe described above, in which the magnitude of the resultant force of the force applied to the stylus by the elastic member and the attractive force linearly changes with respect to the displacement of the stylus. Thereby, the measurement force of the stylus during measurement can be changed in response to the displacement of the stylus.

Another aspect of the present invention is the contact probe described above, in which both the first magnetic member and the second magnetic member are permanent magnets. Thereby, heat and control noise can be prevented from occurring when using an electromagnet or an actuator.

Another aspect of the present invention is the contact probe described above, in which one of the first magnetic member and the second magnetic member is a permanent magnet, and the other is a magnetic body. Thereby, heat and control noise can be prevented from occurring when using the electromagnet or the actuator.

Another aspect of the present invention is the contact probe described above, in which the first magnetic member is provided at an opposite end portion of the stylus from the tip, and the second magnetic member is provided separated in the first direction with respect to the first magnetic member. Thereby, the measurement force in the first direction can be adjusted with a simple configuration.

Another aspect of the present invention is the contact probe described above, which further includes a stem, extending in a second direction perpendicular to the first direction, where a first end of the stem is connected with the opposite end portion of the stylus from the tip; an arm, extending in the second direction, where a first end is connected with a second end of the stem; and a fulcrum holding the stem and the arm so as to be capable of rotation with a third direction perpendicular to the first and the second directions as a rotation axis. The first magnetic member is provided at a position separated from the fulcrum of the stem or the arm. Accordingly, in a lever type contact probe, the measurement force acting upon the stylus is adjustable with a simple configuration.

Another aspect of the present invention is the contact probe described above, which further includes a contact prevention portion preventing contact between the first magnetic member and the second magnetic member. Accordingly, when the first magnetic member and the second magnetic member come close to each other, contact between the first magnetic member and the second magnetic member can be prevented. In particular, when the attraction force is generated between the first magnetic member and the second magnetic member, displacement of the stylus can be prevented from becoming unstable.

Another aspect of the present invention is the contact probe described above, in which a distance between the first magnetic member and the second magnetic member can be changed in each measurement. Thereby, a measurement amount can be adjusted according to a measurement purpose.

According to the present invention, the measurement force of the contact probe can be adjusted by a simple configuration.

The objects, features, and advantages of the present invention described above are clarified and added to by the following detailed description and the appended drawings. The appended drawings are referenced only to facilitate understanding and do not serve to limit the present invention.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings. Identical reference numerals are assigned to identical elements in each of the plurality of drawings, and thus duplicative descriptions are omitted where necessary.

First Embodiment

Figure 1:
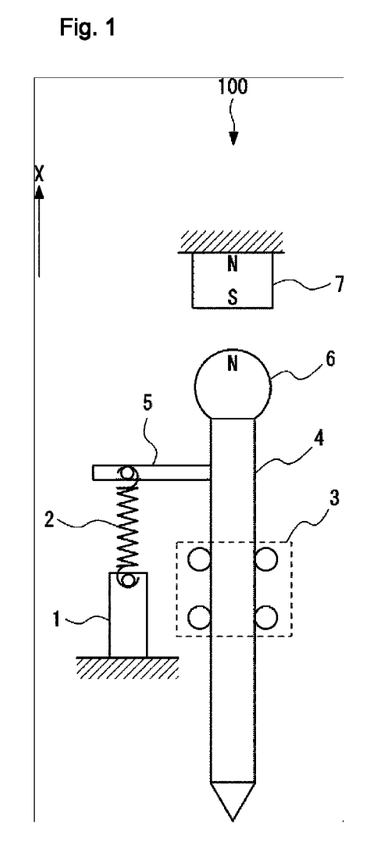
FIG. 1 is a front view schematically illustrating a configuration of a contact probe according to a first embodiment.

First, a description is given of a contact probe 100 according to a first embodiment. FIG. 1 is a front view schematically illustrating a configuration of the contact probe 100 according to the first embodiment. In FIG. 1, a bottom-to-top direction along a vertical direction on a plane of the drawing sheet is indicated as an X direction. In addition, the X direction in FIG. 1 is referred to as a first direction.

The contact probe 100 has a fixed portion 1, a spring 2, a guide 3, a stylus 4, a magnetic body 6, and a permanent magnet 7.

The fixed portion 1 is a portion fixated to a measuring device (such as a coordinate measuring machine). In order to simplify the figure, details of the measuring device are not shown in FIG. 1.

The X direction is treated as a length direction and an end portion on the X(−) side of the stylus 4 contacts a measured object. The stylus 4 is held by the guide 3 so as to be movable only in the X direction. The magnetic body 6 is fixated to the end portion on the X(+) side of the stylus 4. In this example, the magnetic body 6 is a spherical shape. A spring connecting part 5 is a portion of the stylus 4 and is a member which extends to a position above (X(+) side) the fixed portion 1, protruding in a direction perpendicular to the X direction from the stylus 4.

The spring 2 is connected with the fixed portion 1 on a first end and with the spring connecting part 5 on a second end such that an expansion/contraction direction lies along the X direction.

The permanent magnet 7 is arranged, separated from the magnetic body 6, above (X(+)side) the magnetic body 6. Similar to the fixed portion 1, the permanent magnet 7 is fixated to, for example, the measuring device (such as the coordinate measuring machine). In this example, the X(+) side surface of the permanent magnet 7 is the north pole, and the X(−) side surface is the south pole. Accordingly, the X(+) side of the magnetic body 6 is the north pole.

The contact probe 100 scans a measured object while the stylus 4 provides the measurement force to the measured object by extending the spring 2. In addition, a profile of the measured object is measured by detecting a displacement in the X direction with respect to a reference position.

Figure 2:
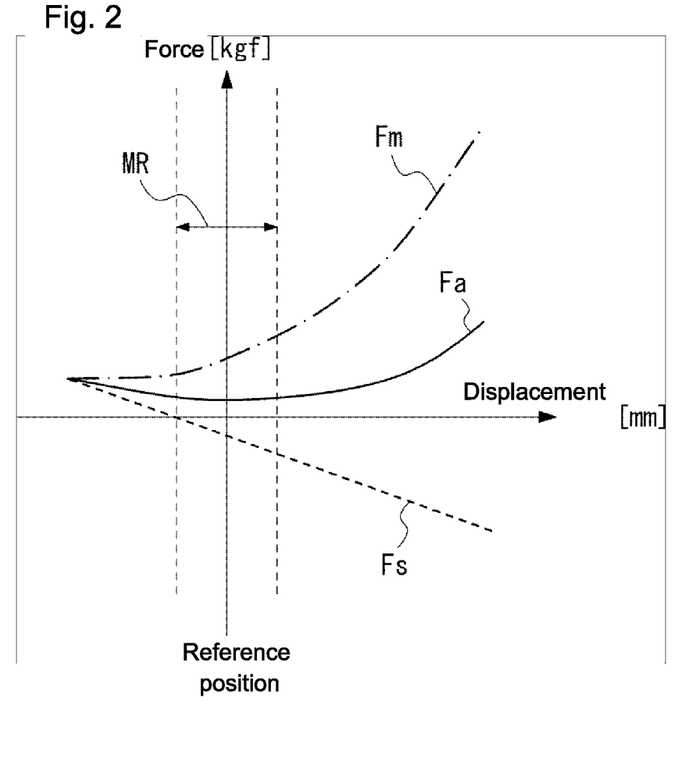
FIG. 2 is a graph illustrating forces which act upon the contact probe according to the first embodiment.

FIG. 2 is a graph illustrating forces which act upon the contact probe 100 according to the first embodiment. As shown in FIG. 2, when the stylus 4 is displaced to the X(+) side from the reference position, the spring 2 further extends and therefore a spring force Fs applied to the stylus 4 in the X(−) direction becomes stronger. In addition, since the magnetic body 6 approaches the permanent magnet 7, an attraction force Fm generated by the magnetic force acting in an area between the magnetic body 6 and the permanent magnet 7 becomes stronger.

When the stylus 4 is displaced to the X(−) side from the reference position, the spring 2 contracts and therefore the spring force Fs applied to the stylus 4 in the X(−) direction becomes weaker. In addition, since the magnetic body 6 moves farther from the permanent magnet 7, the attraction force Fm generated by the magnetic force acting in the area between the magnetic body 6 and the permanent magnet 7 becomes weaker.

Given the above, the spring force in the X(−) direction and the magnetic force in the X(+) direction act on the stylus 4. Specifically, this can be understood as the magnetic force acting upon the stylus 4 so as to cancel out the spring force. In addition, as the displacement toward the X(+) direction of the stylus 4 becomes larger, the spring force and the magnetic force become larger. As the displacement toward the X(−) direction of the stylus 4 becomes larger, the spring force and the magnetic force become smaller. Accordingly, it becomes possible to inhibit a magnitude of a force Fa materially acting upon the stylus 4 and to equalize the magnitude of the forces. As a result, the measurement force acting upon the measured object can be inhibited and equalized.

In addition, if a range MR shown in FIG. 2 is set as a measuring range, the measurement force Fa within the measuring range can generally be kept constant.

As noted above, the contact probe 100 adjusts the measurement force with a simple configuration combining a flat plate-like elastic member (a leaf spring) and the permanent magnet. In other words, there is no need to introduce a configuration performing active control, such as an actuator, in order to adjust the measurement force. Accordingly, highly accurate measurement can be performed since heat and noise generated in association with the control can be prevented.

In addition, the polarity of the permanent magnet 7 mentioned above is merely exemplary. For example, magnetic poles of the permanent magnet 7 can be swapped. In this case, the X(+) side surface of the permanent magnet 7 is the south pole, and the X(−) side surface is the north pole. Accordingly, the X(+) side of the magnetic body 6 is the south pole.

In addition, the spring 2 is merely exemplary of an elastic body. In other words, different types of springs, such as a coil spring, or other elastic members can be used.

In the present embodiment and the embodiments hereafter, a permanent magnet and a member composed of magnetic material (magnetic body) shall also be referred to as a magnetic member.

Second Embodiment

Figure 3:
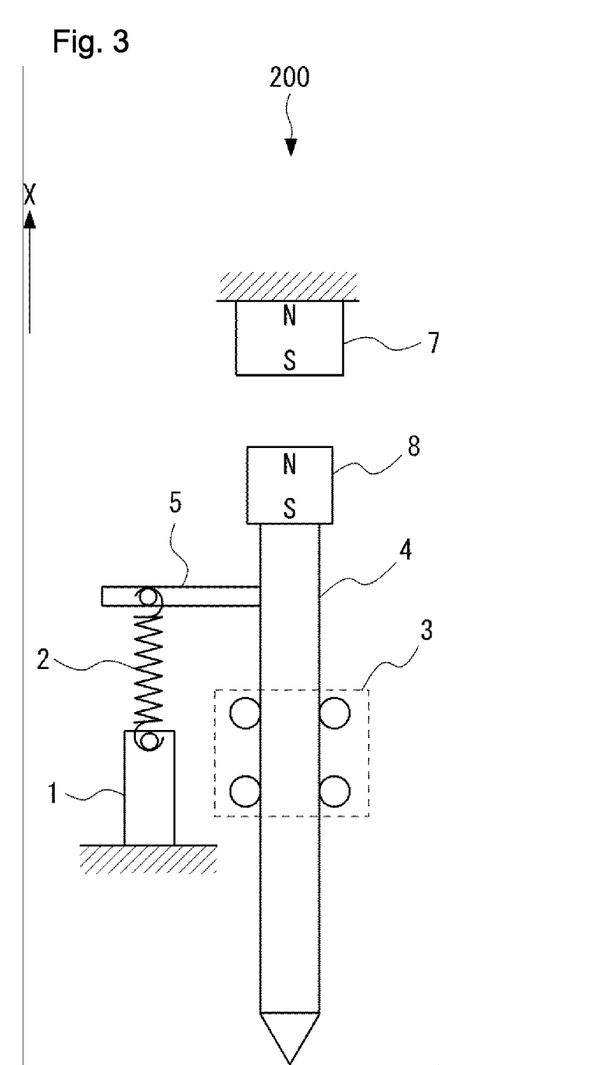
FIG. 3 is a front view schematically illustrating a configuration of a contact probe according to a second embodiment.

A description is given of a contact probe 200 according to a second embodiment. FIG. 3 is a front view schematically illustrating a configuration of the contact probe 200 according to the second embodiment. The contact probe 200 has a configuration in which the magnetic body 6 of the contact probe 100 is replaced by a permanent magnet 8.

In this example, an X(+) side surface of the permanent magnet 8 is the north pole, and an X(−) side surface of the permanent magnet 8 is the south pole. The X(+) side surface of the permanent magnet 7 is the north pole, and the X(−) side of the permanent magnet 7 is the south pole. Therefore, an attraction force generated by magnetic force acts upon an area between the permanent magnet 7 and the permanent magnet 8, similar to the contact probe 100.

Given the above, similar to the contact probe 100, the spring force in the X(−) direction and the magnetic force in the X(+) direction act on the stylus 4. As a result, this can be understood as the magnetic force acting upon the stylus 4 so as to cancel out the spring force. In addition, similar to the contact probe 100, it becomes possible to inhibit the magnitude of the force Fa materially acting upon the stylus 4 and to equalize the magnitude of the forces. As a result, the measurement force acting upon the measured object can be inhibited and equalized.

In addition, the polarities of the permanent magnets 7 and 8 mentioned above are merely exemplary. For example, magnetic poles of the permanent magnets 7 and 8 can be swapped. In this example, the X(+) side surfaces of the permanent magnets 7 and 8 are the south pole, and the X(−) side surfaces are the north pole.

Third Embodiment

Figure 4:
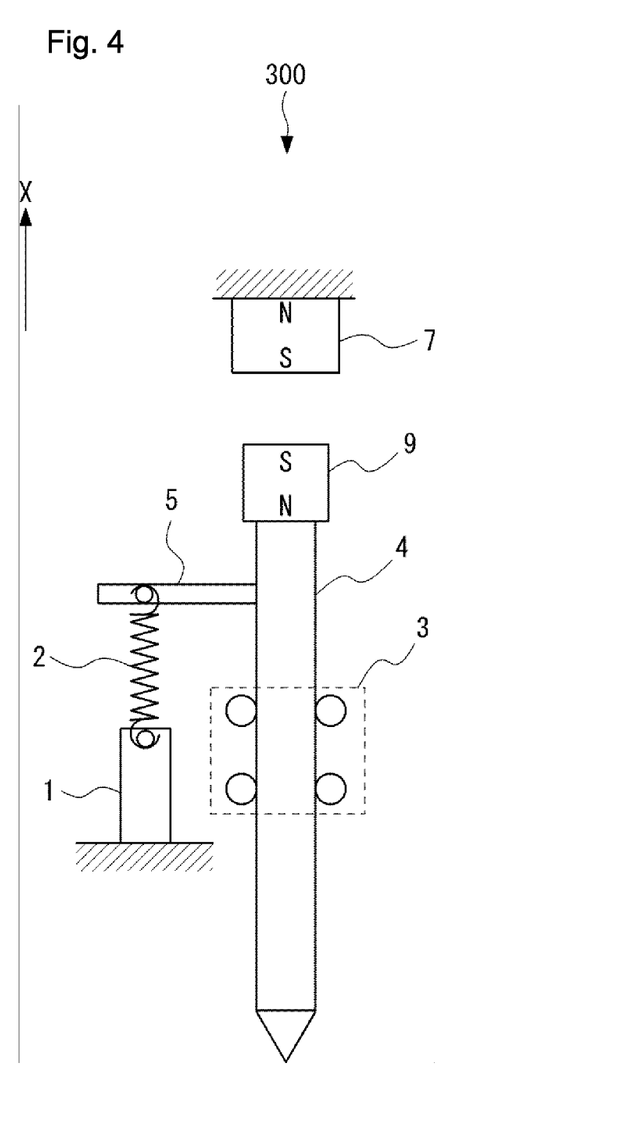
FIG. 4 is a front view schematically illustrating a configuration of a contact probe according to a third embodiment.

A description is given of a contact probe 300 according to a third embodiment. FIG. 4 is a front view schematically illustrating a configuration of the contact probe 300 according to the third embodiment. The contact probe 300 has a configuration in which the magnetic body 6 of the contact probe 100 is replaced by a permanent magnet 9.

In this example, an X(+) side surface of the permanent magnet 9 is the south pole, and an X(−) side surface of the permanent magnet 9 is the north pole. The X(+) side surface of the permanent magnet 7 is the north pole, and the X(−) side of the permanent magnet 7 is the south pole. Accordingly, a repulsive force generated by magnetic force acts in the area between the permanent magnet 7 and the permanent magnet 9.

Figure 5:
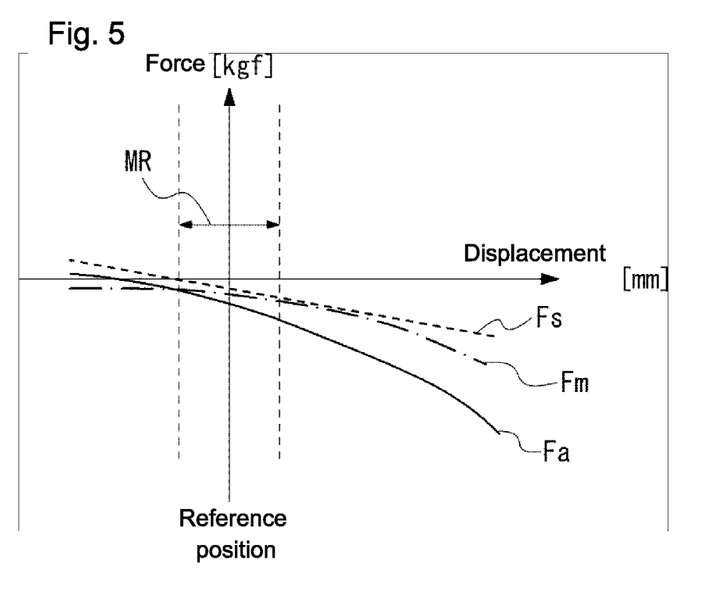
FIG. 5 is a graph illustrating forces which act upon the contact probe according to the third embodiment.

FIG. 5 is a graph illustrating forces which act upon the contact probe 300 according to the third embodiment. As shown in FIG. 5, the spring 2 further extends when the stylus 4 is displaced toward the X(+) side from the reference position, and therefore the spring force applied to the stylus 4 in the X(−) direction becomes stronger. In addition, since the permanent magnet 9 approaches the permanent magnet 7, the repulsive force generated by magnetic force acting in the area between the permanent magnet 9 and the permanent magnet 7 becomes stronger.

The spring 2 contracts when the stylus 4 is displaced toward the X(−) side from the reference position, and therefore the spring force applied to the stylus 4 in the X(−) direction becomes weaker. In addition, since the permanent magnet 9 moves farther from the permanent magnet 7, the repulsive force generated by magnetic force acting in the area between the permanent magnet 9 and the permanent magnet 7 becomes weaker.

Given the above, the spring force in the X(−) direction and the magnetic force (repulsive force) in the X(−) direction act on the stylus 4. Specifically, this can be understood as the magnetic force acting on the stylus 4 so as to be added to the spring force. In addition, as the displacement of the stylus 4 becomes larger in the X(+) direction, the spring force and the magnetic force become larger. As the displacement of the stylus 4 becomes larger in the X(−) direction, the spring force and the magnetic force become smaller. Accordingly, it becomes possible to increase the magnitude of the forces materially acting upon the stylus 4 as the stylus 4 is displaced toward the X(+) direction. As a result, the measurement force which acts upon the measured object can be changed linearly in response to the displacement of the stylus, and therefore, responsiveness of the measurement can be changed. Moreover, a range MR shown in FIG. 5 is an example of the measuring range.

In addition, the polarity of the permanent magnets 7 and 9 mentioned above is merely exemplary. For example, magnetic poles of the permanent magnets 7 and 9 can be swapped. In this example, the X(+) side surface of the permanent magnet 7 is the north pole, and the X(−) side of the permanent magnet 7 is the south pole. The X(+) side surface of the permanent magnet 9 is the south pole and the X(−) side of the permanent magnet 9 is the north pole.

Fourth Embodiment

Figure 6:
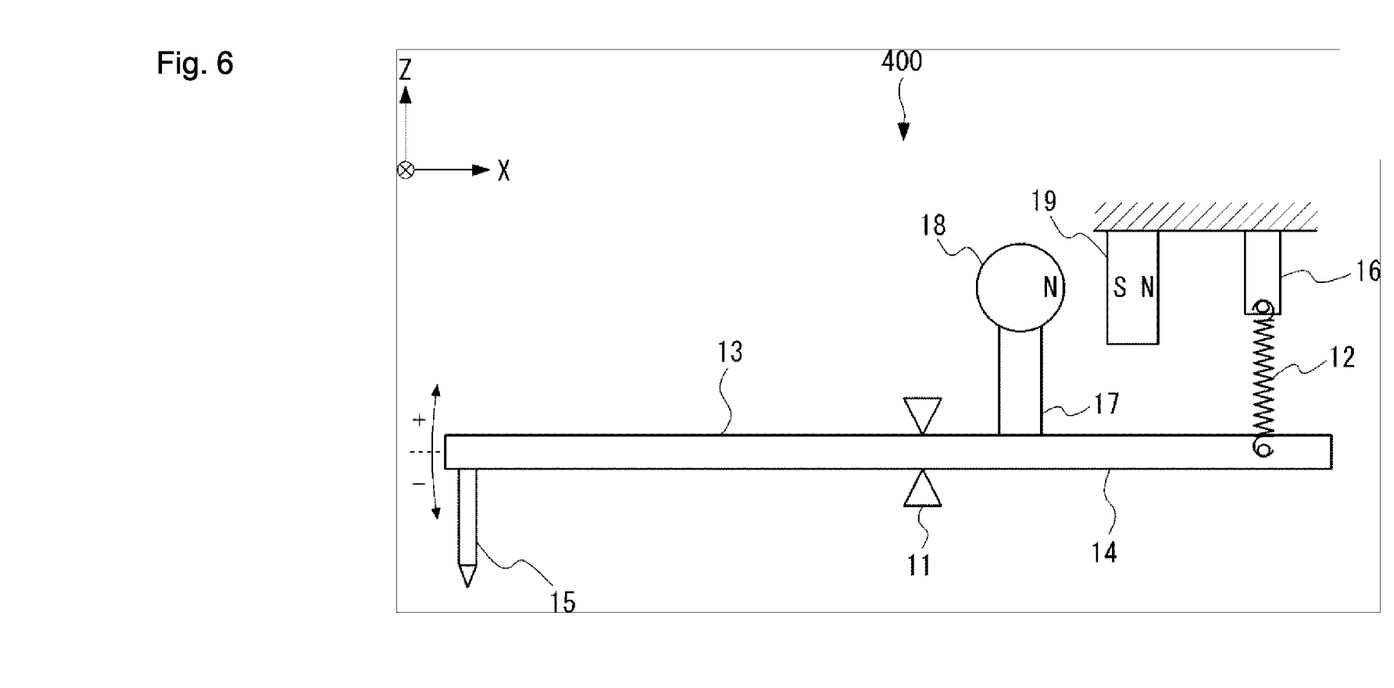
FIG. 6 is a front view schematically illustrating a configuration of a contact probe according to a fourth embodiment.

A description is given of a contact probe 400 according to a fourth embodiment. FIG. 6 is a front view schematically illustrating a configuration of the contact probe 400 according to the fourth embodiment. In FIG. 6, a left-to-right direction along a direction horizontal to a plane of the drawing sheet is indicated as an X direction, a depth direction from a front side of the paper to a back side of the paper along a direction perpendicular to the plane of the drawing sheet is indicated as a Y direction, and a bottom-to-top direction along a vertical direction of the plane of the drawing sheet is indicated as a Z direction. In other words, X, Y, and Z directions are mutually orthogonal directions. Moreover, a relationship between the X, Y, and Z directions is the same in the drawings referenced hereafter and in the following description. In this example, the X direction is referred to as a second direction, the Y direction as a third direction, and the Z direction as the first direction.

The contact probe 400 has a fulcrum 11, a spring 12, a stem 13, an arm 14, a stylus 15, a fixed portion 16, a magnetic body 18, and a permanent magnet 19.

The stylus 15 projecting downward (Z(−) side) is attached to a first end (end portion of X(−) side) of the stem 13, which extends in the X direction. A Z(−) side end of the stylus 15 contacts the measured object. A first end (end portion of the X(−) side) of the arm 14 extending in the X direction is connected to a second end of the stem 13 (end portion of the X(+) side). The stem 13 and the arm 14 are held by the fulcrum 11 near where the stem 13 and the arm 14 connect to each other. Thus, the stem 13 and the arm 14 can rotate, centered on the fulcrum 11, about a rotation axis in the Y direction.

The fixed portion 16 is a portion fixated to the measuring device (such as a coordinate measuring machine). In order to simplify the figure, details of the measuring device are not shown in FIG. 6. The spring 12 is connected to the arm 14 on the first end and to the fixed portion 16 on the second end such that an expansion/contraction direction lies along the Z direction.

A magnetic body attachment portion 17, which is a portion of the arm 14 projecting upward (on the Z(+) side), is attached to the arm 14. The magnetic body 18 is provided on a Z(+) side end of the magnetic body mounting portion 17. In this example, the magnetic body 18 has a spherical shape. Thereby, similar to how the positions of the magnetic body 6 and the permanent magnet 7 are fixated with respect to the stylus 4 according to the above-described embodiments, a position of the magnetic body 18 is fixated with respect to the stylus 15.

The permanent magnet 19 is provided separated in the X(+) direction with respect to the magnetic body 18. Similar to the fixed portion 16, the permanent magnet 19 is fixated to, for example, the measuring device (such as a coordinate measuring machine). In this example, an X(+) side surface of the permanent magnet 19 is the north pole, and an X(−) side surface of the permanent magnet 19 is the south pole. Accordingly, the X(+) side of the magnetic body 18 is the north pole.

Next, operation of the contact probe 400 is described. In this example, for an amount of displacement of the stylus 15, the displacement in a counterclockwise direction with respect to the reference position is indicated as −, and displacement in a clockwise direction with respect to the reference position is indicated as +.

When the stem 13 and the arm 14 are in the reference position, torque is generated in the − (minus) direction (counterclockwise) since the spring 12 is in an extended state. At this time, an attraction force in the area between the magnetic body 18 and the permanent magnet 19 is only in the X direction. Therefore, no torque is generated in the Z direction.

When measuring, the stylus 15 is displaced in accordance with a shape of the measured object. Accordingly, the torque generated by the spring 12 and the magnetic force changes. As the stylus 15 is displaced in the − direction (counterclockwise direction), the torque generated by the spring 12 in the − direction (counterclockwise direction) decreases. In addition, the magnetic body 18 is rotationally displaced in the counterclockwise direction. At this time, the attraction force in the area between the magnetic body 18 and the permanent magnet 19 produces a component along the Z direction. Therefore, torque is generated in the + direction (clockwise direction) by the attraction force in the area between the magnetic body 18 and the permanent magnet 19.

As the stylus 15 is displaced in the + direction (clockwise direction), the torque generated by the spring 12 in the − direction (counterclockwise direction) increases. In addition, the magnetic body 18 is rotationally displaced in the clockwise direction. At this time, the attraction force in the area between the magnetic body 18 and the permanent magnet 19 produces a component along the Z direction. Therefore, torque is generated in the − direction (counterclockwise direction) by the attraction force in the area between the magnetic body 18 and the permanent magnet 19.

As described above, the measurement force of the stylus 15 is generated by the torque in the − direction (counterclockwise direction) which is a combination of the torque generated by the spring 12 and the torque generated by the magnetic force. As the displacement of the stylus 15 increases in the Z(−) direction, the spring force decreases, and the magnetic force in an opposite direction from the spring force decreases, and thus the spring force and the magnetic force cancel each other out. As the displacement of the stylus 15 increases in the Z(+) direction, the spring force increases, and the magnetic force in the opposite direction from the spring force increases. Accordingly, as the stylus 15 is displaced toward the Z(+) direction, it becomes possible to keep the magnitude of the forces materially acting upon the stylus 4 constant within the measuring range. As a result, highly accurate measurement is possible with less change of measurement force.

As defined herein, the spring 12 is any elastic body or device that recovers its original shape when released after being distorted, and is not limited to a metal spring. Rather, the spring 12 is only an example of an elastic member or elastomer. In other words, different types of springs, such as a coil spring or other elastic members or elastomers can be used.

In the above, the magnetic body 18 is attached to the arm 14, however, this is only exemplary. The magnetic body 18 can be attached to the stem 13 as long as there is no interference during measurement. In addition, the magnetic body 18 can be arranged in a position separated from the fulcrum 11 in the Z direction as long as there is no interference during measurement. Moreover, the magnetic body attachment portion 17 is not required and the magnetic body 18 may simply be attached to the stem 13 or the arm 14 such that the position of the magnetic body 18 is fixated with respect to the stylus 15. Furthermore, the permanent magnet 19 may simply be arranged separated from the magnetic body 18 in a radial direction of an orbit (circular orbit) through which the magnetic body 18 is displaced.

Other Embodiments

Moreover, the present invention is not limited to the embodiments described above, and may be modified as needed without departing from the scope of the present invention. For example, in the embodiments described above, the distance between the magnetic members mutually arranged at opposite ends can be changed according to a measurement purpose. That is, a mechanism enabling the distance between the magnetic members mutually arranged at opposite ends to be changed may be added to the contact probe according to the embodiments described above, and the distance between the magnetic members mutually arranged at opposite ends may be changed as needed before commencing measurement. That is, in the embodiments described above, the distance between the magnetic body 6 and the permanent magnet 7, the distance between the permanent magnet 7 and the permanent magnet 8, the distance between the permanent magnet 7 and the permanent magnet 9, and the distance between the magnetic body 18 and the permanent magnet 19 can each be changed. Changing the distance between mutually opposing magnetic members enables handling of measurements requiring a high measurement force, and responsiveness of the measurement can be changed by decreasing the measurement force according to a measurement purpose. As a result, a simple configuration can handle various measurements and measured objects.

The stem 13 and the arm 14 are independent of one another in the fourth embodiment described above; however, this is only exemplary. Thus, the stem 13 and the arm 14 can be an integrated member.

A contact probe according to the above-noted embodiments can be provided with a contact prevention portion preventing contact between the first magnetic member (magnetic body 6, permanent magnets 8 and 9) and the second magnetic member (permanent magnet 7). The contact prevention portion is particularly effective when an attraction force acts upon an area between the first magnetic member and the second magnetic member.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A contact probe comprising:
   a stylus having a tip at a first end thereof and displaceable in a first direction such that the tip is contactable with an object to be measured;
   a spring having a fixed first end and a second end configured to apply force to the stylus along the first direction;
   a first magnet fixed to a second end of the stylus; and
   a second magnet separately provided from the first magnet so as to generate a magnetic force along the first direction between the first magnet and the second magnet.

2. The contact probe according to claim 1, wherein the magnetic force is an attractive force and acts in an area between the first magnet and the second magnet.

3. The contact probe according to claim 2, wherein a magnitude of a resultant force applied to the stylus by the spring and the attractive force is constant with respect to the displacement of the stylus.

4. The contact probe according to claim 1, wherein a repulsive force generated by the magnetic force acts upon the area between the first magnet and the second magnet.

5. The contact probe according to claim 3, wherein a magnitude of a resultant biasing force applied to the stylus by the spring and the attractive force linearly changes with respect to the displacement of the stylus.

6. The contact probe according to claim 1, wherein both the first magnet and the second magnet are permanent magnets.

7. The contact probe according to claim 1, wherein one of the first magnet and the second magnet is a permanent magnet, and the other is a magnetic body.

8. The contact probe according to claim 1, wherein the second end is at an end of the stylus opposite the tip, and the second magnet is separately provided in the first direction with respect to the first magnet.

9. The contact probe according to claim 1, further comprising:
   a stem extending in a second direction perpendicular to the first direction, the stem having a first end connected a portion of the stylus opposite the tip;
   an arm, extending in the second direction and having a first end connected to a second end of the stem; and
   a fulcrum holding the stem and the arm such that the stem and arm are rotatable in a third direction as a rotation axis perpendicular to the first and the second directions, wherein the first magnet is separately positioned from the fulcrum.

10. The contact probe according to claim 1, further comprising a contact preventer configured to prevent contact between the first magnet and the second magnet.

11. The contact probe according to claim 1, wherein a distance between the first magnet and the second magnet is changeable for each measurement.

* * * * *

UNITED STATES PATENT AND TRADEMARK OFFICE
CERTIFICATE OF CORRECTION

PATENT NO. : 9,869,537 B2
APPLICATION NO. : 15/059528
DATED : January 16, 2018
INVENTOR(S) : K. Hidaka et al.

Page 1 of 1

It is certified that error appears in the above-identified patent and that said Letters Patent is hereby corrected as shown below:

In the Claims

Column 10, Lines 62, 63 (Claim 9, Lines 4, 5) please change "connected a" to -- connected to a --

Signed and Sealed this
Fourth Day of June, 2019

Andrei Iancu
*Director of the United States Patent and Trademark Office*